UNITED STATES PATENT OFFICE.

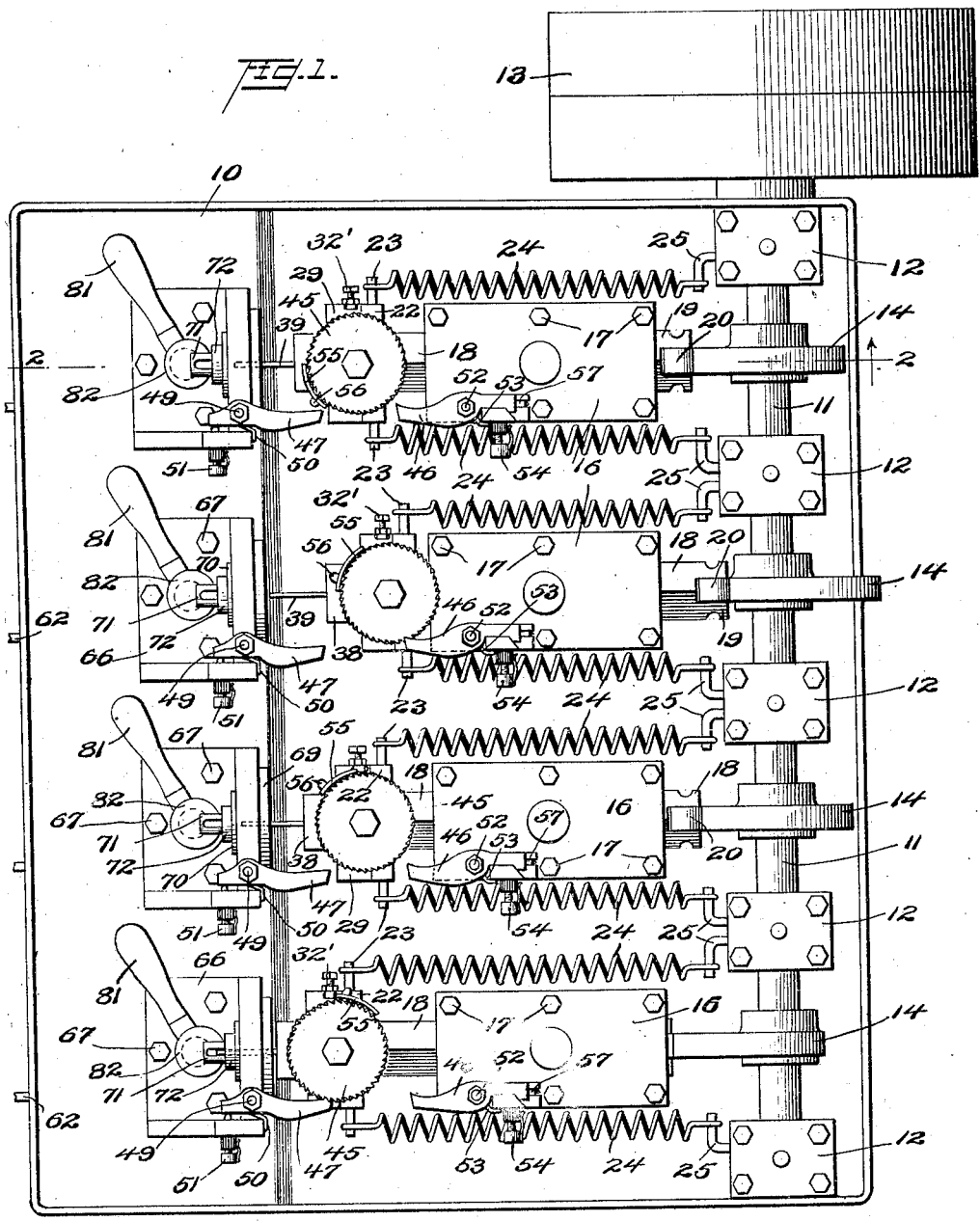

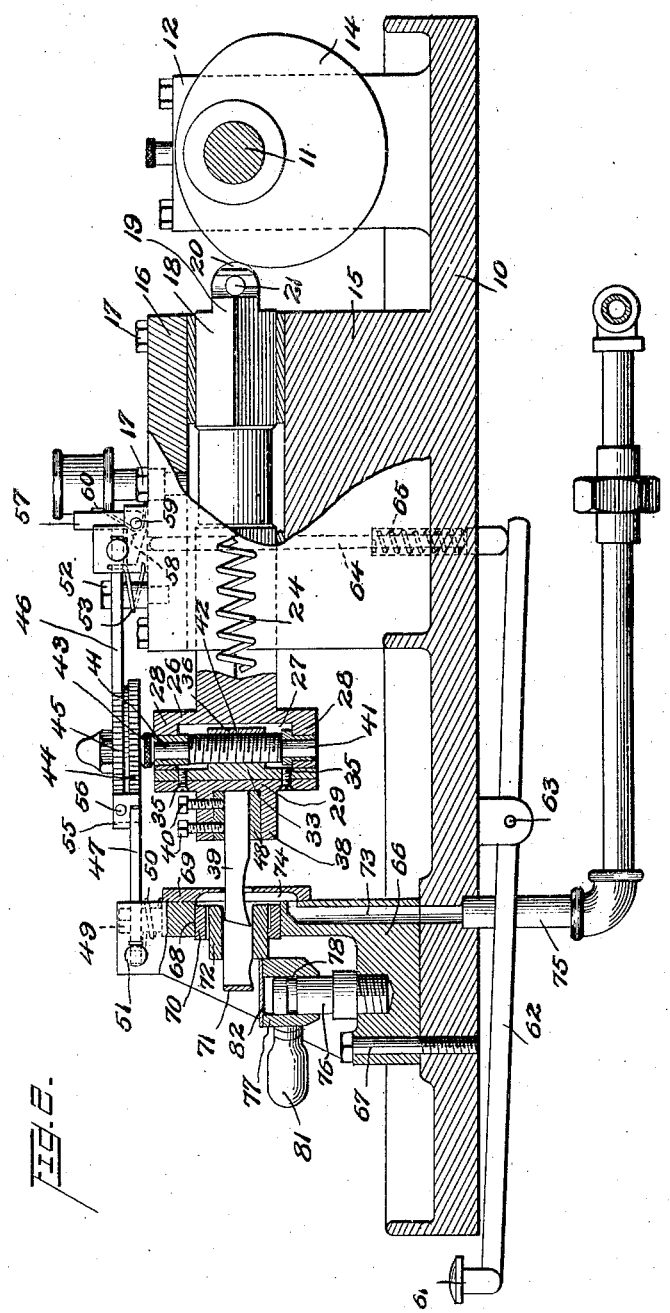

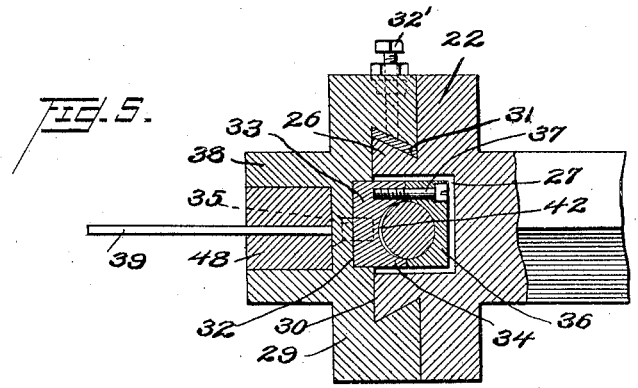
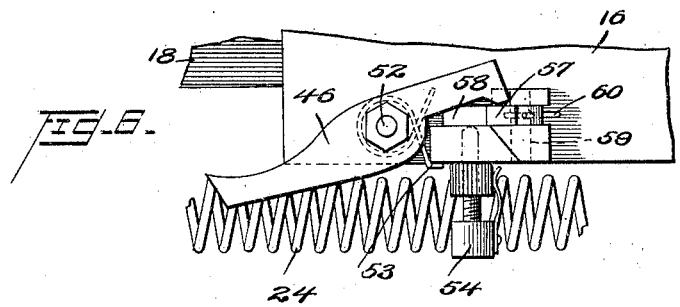
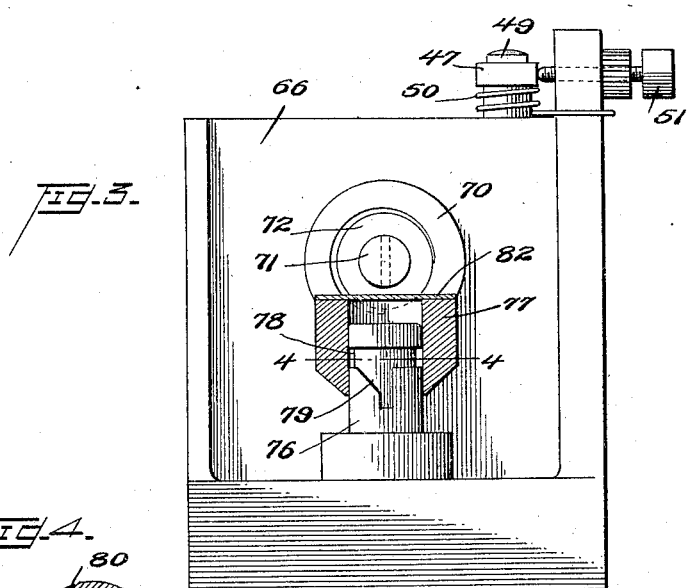
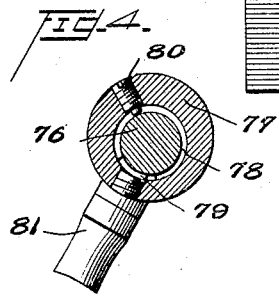

HENRY E. VAN NESS, OF ELMIRA, NEW YORK.

GROOVE-CUTTING MACHINE.

1,362,202.   Specification of Letters Patent.   Patented Dec. 14, 1920.

Application filed September 19, 1919. Serial No. 324,777.

*To all whom it may concern:*

Be it known that I, HENRY E. VAN NESS, a citizen of the United States, and residing at Elmira, Chemung county, State of New York, have invented certain new and useful Improvements in Groove-Cutting Machines, of which the following is a specification.

This invention relates to machines for cutting grooves, especially in metal articles. In the form shown the machine cuts a longitudinal interior groove of uniform depth in the inner surface of an article having a hole through it. It was designed particularly for the purpose of forming a comparatively large keyway in an article having a relatively small hole and to overcome the difficulties and troubles encountered in attempting to do this on a commercial scale of production with the machinery available in the prior art. In the form shown the cutting tool continuously reciprocates longitudinally a fixed distance, such as that used in actual cutting being driven by a constantly rotating shaft. The person operating the machine may, however, place the pieces of metal or articles in which the groove is to be cut on the support in position for cutting and clamp them in place easily and conveniently during such reciprocation, since at that time the reciprocating tool is moving in a path slightly removed from the surface to be cut and the support is so formed as to prevent the possibility of the tool accidentally striking the article while it is being placed in position and clamped there. After the article is clamped in position, the attendant presses a starting button or lever which brings into operation automatic means causing the tool to cut a groove of predetermined depth in the article by a predetermined number of strokes and to then return to its original reciprocating position out of line with the normal surface of the work, and to continue reciprocating on that line until the attendant has taken off the finished article and substituted another and has again pressed the starting button. In this cutting operation the tool approaches the work a fixed distance before its forward or cutting movement and recedes from the work a less fixed distance before the return stroke to prevent the dragging of the cutting tool over the face of the work, and consequent wear and it will be observed that the difference between the amount of the approach movement and the receding movement represents the depth of each cut. The continuous reciprocation and the automatic action in cutting the groove and then returning the cutting tool to its original idle reciprocating position, makes it possible to mount a number of work supports and reciprocating tools side by side driven by the same shaft and requiring only one attendant to keep them all in operation. The several tools will finish their work in the order in which the attendant secures the articles in place and presses the starting levers and, therefore, a single attendant can operate a number of cutters at full speed without having any of them idle for any appreciable time. This automatic operation is believed to be broadly new and it is the intention to claim it broadly without limitation to the particular embodiment shown. The structure furthermore is simple, strong and efficient, and not likely to get out of order and includes many other novel features which will be understood from the following description and claims. It will be understood that the structural features shown in the drawing for purpose of illustrating one embodiment of my invention may be changed in many respects without departing from my invention. In the drawings—

Figure 1 is a plan view including four groove cutting machines embodying my invention;

Fig. 2 is a view partly in section on the line 2—2 of Fig. 1;

Fig. 3 is an enlarged end view of the work support, the clamping cam being in section;

Fig. 4 is a cross section on the line 4—4 of Fig. 3;

Fig. 5 is an enlarged section taken vertically through the tool carrier; and

Fig. 6 is an enlarged view of one of the operating pawls and its control mechanism.

In the drawings 10 represents a supporting base which may be made of cast iron or other suitable material and which has mounted on it four groove cutting machines as indicated in Fig. 1. A rotary shaft 11 is mounted in bearings 12 carried by the base 10 and is driven by any suitable means, such as the belt pulley 13. Fixed on the shaft 11 are a series of small disks or cams 14 having outer surfaces adapted as hereinafter explained to make contact with a portion of a tool carrying mechanism to cause longitudinal movement thereof. In front of each cam 14 there is a support 15 carried by the base 10, and having the removable cover plate 16 held in place by bolts 17. The support 15 and cover plate 16 form between them bearings for the longitudinally movable shaft 18, the cross section of the bearing opening and shaft being such as to prevent rotary motion of the shaft while permitting free longitudinal movement. The end 19 of the shaft is partly cut away at top and bottom, and is provided with a vertical slot in which is mounted a roller 20 carried on a bearing pin 21 and this roller is in line with, and makes peripheral contact with the cam 14. The shaft 18 extends entirely through the support 15 and has at its end an enlarged head portion 22 which in the form shown is circular in cross section. It has projecting laterally from it hooks or members 23 to which are secured the ends of the coiled tension springs 24, which are secured at their other ends to hooks or members 25 fastened to the bearing supports 12. These springs are at all times under tension pulling the shaft or rod 18 back toward the cam shaft 11 and causing its roller 20 to maintain peripheral contact with the cam 14. This cam on the rotation of shaft 11 forces the shaft 18 longitudinally in one direction which in practice is the cutting stroke and the two springs 24 pull the shaft 18 back when the low points of the cam are opposite roller 20. When shaft 11 is rotating, therefore, the member 18 is constantly reciprocated longitudinally being positively driven by the cam for the cutting stroke and yieldingly returned by the spring action. It will, of course, be understood that the invention is not limited to this particular means for securing reciprocation of the mechanism carrying the cutting tool.

The head 22 on the end of the reciprocating member 18 has a vertically extending projection 26 (see Fig. 5) which has undercut or inwardly inclined side walls. Vertically along the center of the projection 26 there is a groove 27 which terminates short of the top and bottom of the head 22, leaving end walls 28 (see Fig. 2). A tool carrier 29 having an outline similar to the head 22 is mounted on and fits the outer face of that head, and has a central vertical groove 30 having undercut or inclined side walls in which groove fits the projection 26 of the head 22. The groove may be made slightly wider than the projection 26 and a removable filler piece 31 may be inserted to make a close fit and may be held in place by set screw 32'. The tool carrier 29 may thus move vertically on the head 22, being guided and held in place by the undercut projection 26 fitting in the undercut groove 30 and the filler piece 31 may be adjusted to make the parts fit properly and changed in case of wear. The tool carrier has central of the groove 30 an additional groove 32 in which is mounted a member 33 having a projecting portion 34 which terminates considerably short of the ends of the groove, and which has therein a vertical screw threaded opening. The member 33 may be held in place by screws 35 and the projecting portion 34 may have an outer removable section 36 held in place by screws 37, as shown in Fig. 5. The tool carrier 29 has on its outer face the tubular projecting sleeve 38, having therein the filler piece 48 in which fits the end of a cutting tool 39 projecting therefrom on a line parallel to the movement of the shaft 18. The tool is removably held in place by set screws 40, as shown in Fig. 2. A vertical rod 41 having smooth end bearings in the end walls 28 of the slot in the head 22 permitting turning but adapted to prevent endwise movement of said rod, is provided along its central portion with screw threads 42, fitting the screw threaded opening in the projection 34, which is secured to the tool carrier 29. It will thus be observed that the turning of rod or shaft 41 will result in moving the tool carrier 29 and tool 39 up or down in accordance with the direction in which the rod is turned. The rod 41 has secured to it above the head 22 a knurled finger piece 43 for turning it by hand and adjusting it. Two ratchet wheels 44 and 45 having their teeth facing in opposite directions are secured to the upper end of the screw threaded rod 41. These ratchet wheels are parallel and close together and, of course, being carried by the shaft 18 have a longitudinally reciprocating movement with the cutting tool during the operation of the machine. In that movement they come in contact respectively with, and are turned by, the points of the oppositely facing pawls 46 and 47 mounted on fixed pivots, the contact of one ratchet wheel with its pawl being on the forward stroke of the tool carrier mechanism, and the contact of the other ratchet wheel with its pawl being on the return stroke. The result of this turning movement of the ratchet wheels, and the attached screw threaded rod 41 is in one instance to raise the tool and its carrier, and in the other instance is to lower the tool. The pawl 47 is mounted on top of the work support 66 and is pivoted for horizontal movement at 49, and there is a spring 50 tending to turn its operative end in toward the line of movement of the ratchet wheel 44. Its position, and consequently its effective action on the ratchet wheel, is regulated by the screw 51 bearing against its free or inoperative end. When the ratchet wheel 44 comes in contact with and is turned by its pawl 47, the tool is raised a fixed distance according to the adjustment of the pawl, and it may be stated here that this takes place after the tool passes over the work on its cutting stroke, and before its return movement, so that the tool will be moved away from the cut surface on its return stroke and prevent dragging and wear on the point of the tool. The pawl 46 is pivoted at 52 on the top of the housing 16, and the spring 53 tends to turn its operative point into the path of the ratchet wheel 45. Its normal position is controlled by the adjusting screw 54 bearing against its free end, as shown in Fig. 6. The ratchet wheel 45 comes in contact with, and is turned by, the pawl 46 on the return stroke after the point of the tool has been withdrawn across the face of the work to be cut, and the result is to move the tool and its carrier down a fixed distance determined by the adjustment of the pawl toward the work. The pawls 46 and 47 are in practice so adjusted and made to so proportionately engage their ratchet wheels, that the movement toward the work due to the action of the pawl 46 will be greater than the movement away from the work due to pawl 47 and the difference will be the depth of cut made by the tool on each stroke. As above stated, this may be regulated to suit the conditions of the particular work.

The pawl and ratchet mechanism not only acts automatically to feed the tool toward the work for a cut of a predetermined depth at each forward cutting stroke and relieves it from contact on the return stroke, but is also provided with means for automatically ceasing to cut a particular article after the groove has reached a predetermined depth, and then return the tool to its original position ready to act on new work. For this purpose a plate 55 in the form of a short segment of a circle, fits around the outer surface of ratchet wheels 44 and 45, and is adjustably secured thereto in the desired position and moves with them. It has at one end a knob or projection 56 which is in a plane with the pawl 46 and when turned sufficiently to the right or clockwise in Fig. 1, makes contact with the rear face of pawl 46, turning it on its pivot against the tension of spring 53 until its point will no longer make contact with ratchet wheel 45. An L-shaped member or locking lever having an upright part 57 and horizontal lower part 58 is pivoted at 59 beyond and below the free end of pawl 46 and having a spring 60 tending to turn it to the left or counterclockwise in the position shown in Fig. 2. The upright portion 57 normally rests against the free end of the pawl 46 under the tension of spring 60 and the end of the pawl moves slightly back and forth across said upright portion 57 during the normal operation, when the pawl rides slightly up on the ratchet wheel 45 in its reciprocations, but does not get out of line or out of contact with the end. When, however, the knob 56 on plate 55 raises the pawl 46 sufficiently, the end of the pawl passes beyond the upright portion 57 and it falls or turns in behind the free end of the pawl under the influence of the spring and locks the pawl in that inoperative position. The plate 55 and its knob 56 are so placed on the ratchet wheels that the knob will engage and throw out of action the pawl 46 when the device has made a predetermined number of cuts in the work, and has produced a groove of the desired depth and thus any further cutting will be automatically stopped. It will be understood that at the commencement of the cutting action on any work, the plate 55 is in the position shown in the upper cutting mechanism of Fig. 1 with its edge at the point where the pawl 47 would strike the ratchet wheel and at each reciprocation of the cutting mechanism it turns clockwise a fixed distance and anti-clockwise a less fixed distance, and thus by a succession of interrupted steps reaches the position where its knob 56 trips the pawl 46. After the pawl 46 is tripped and locked out of action, the pawl 47 continues to act on ratchet wheel 44 at each return stroke, turning it and the plate 55 anticlockwise a fixed distance on each forward stroke of the cutting machine, thus gradually raising the cutting tool from the work. This continues until the plate 55 gets back to the position shown at the top in Fig. 1, and then the plate interferes with the action of pawl 47 and ratchet wheel 44. At this time the tool has by the said action been removed gradually from the line of the work to its original position out of line with the surface of the work and since neither pawl is then acting, it will continue to reciprocate indefinitely without moving toward or away from the work. The attendant on the machine, however, may easily and quickly set in action the mechanism for feeding the tool toward the work by pressing on the button 61 on the end of lever 62 which is pivoted at 63, since such pressure will raise the rod 64 against the tension of the spring 65 and will through the horizontal section 58 turn the upright part 57 out of locking position behind the end of the pawl 46, thus allowing spring 53 to turn that pawl into operative position ready to engage ratchet wheel 45. The first stroke thereafter turns the ratchet wheels through pawl 46 sufficiently to carry plate 55 out of the path of pawl 47 and, therefore, both pawls will thereafter act as heretofore described.

The work support embodies a main frame 66 secured to the base 10 by bolts 67 and is provided with a circular opening 68, the center of which is in line with the normal movement of the cutting tool 39. Secured to this support on the side next to the cutting mechanism, is a plate 69 having a projecting tubular sleeve 70 fitting in the opening 68 and a central work receiving and supporting cylindrical pin 71 having a vertical slot therein extending therethrough and to a point near its end to receive the cutting tool 39. The article 72 to be acted on by the machine to cut a groove fits on the spindle or pin 71 and within the sleeve 70. The lower side walls of spindle 71 are cut away slightly beyond the end of the work 72 to permit easy escape of the shavings or chips produced by the cutting action. A passageway 73 for suitable lubricant leads up through the support 66 and discharges into the groove 74 on the inner face of plate 69 and this groove extends across the tool opening. Lubricant may be supplied through pipe 75 from any suitable source. It will be observed that the article 72 to be grooved may be easily placed in position by hand over the end of spindle 71, even while the tool 39 is being reciprocated in that spindle, since its cutting edge is shielded and protected from contact with the work by the projecting parts of the spindle until the feed mechanism is set in operation. On the work supporting frame 66 in advance of the end of spindle 71 there is a vertical shaft or rod 76 carrying on its upper portion a rotary clamping cam 77 adapted to make contact with the end of the article 72 and press it against plate 69 and hold it in position. The cam has a cylindrical opening therethrough fitting on the end of shaft 76 and the shaft is provided with a circumferential groove 78 with an enlarged downwardly extending portion 79. The end of a screw 80 extending through the cam enters this groove 78 and holds the cam against removal longitudinally but the enlarged portion 79 of the groove permits the cam to descend a certain distance when it is in one position. The clamping cam may be turned by the handle 81 and when the end of the pin 80 is in the lower part of the enlarged portion 79 of the slot, the cam is in a lower position out of line with the work 72, and at that time the work may be removed and a new article placed in position. When the cam is raised to the point where the end of the screw 80 is in the horizontal portion of the groove 78, the handle may be operated to turn the cam, bringing its thicker portion against the end of the work and clamping it in place against plate 69. The inclined upper portion of the enlargement 79 aids in getting the pin into the horizontal slot. The cam 77 is preferably provided with a cover 82 to prevent cuttings and dirt and other trash from getting in it, and its lower end is tapered to prevent any cuttings below it, from interfering with its action.

Having thus described the invention what is claimed as new and desired to be secured by Letters Patent is:

1. In a groove cutting machine the combination with a constantly reciprocating cutting tool, of a work support and means for clamping the work on said support during the reciprocations of said tool and slightly out of the line of said tool, means adapted to be brought into action manually for causing said tool to automatically approach the work at each reciprocation to cut a groove by a succession of cuts, automatic means for stopping the approach of the tool toward the work when the groove reaches a predetermined depth, automatic means for then returning the tool to its original or normal reciprocating position out of line with the work, and automatic means for then preventing further lateral movement of the tool until manually set in operation.

2. In a groove cutting machine the combination with a constantly reciprocating cutting tool, of a work support and means for clamping the work on said support during the reciprocations of said tool and slightly out of the line of said tool, means adapted to be brought into action manually for causing said tool to automatically approach the work at each reciprocation to cut a groove by a succession of cuts, automatic means for making said tool recede from said work a less distance on the return stroke of each reciprocation, automatic means for stopping the approach of the tool toward the work when the groove reaches a predetermined depth, automatic means for then returning the tool to its original or normal reciprocating position out of line with the work, and automatic means for then preventing further lateral movement of the tool until manually set in operation.

3. In a groove cutting machine the combination with a cutting tool and carrier therefor of a work support adapted to hold the work in position, means for causing relative reciprocatory longitudinal movement between said tool and support and means adapted to be brought into action manually for automatically causing a lateral movement of one of said parts toward the other at each reciprocation to cut a groove by a succession of cuts, automatic means for stopping the lateral movements toward the other member when the groove reaches a predetermined depth and automatic means for then returning the part laterally to its original position.

4. In a groove cutting machine the combination with a cutting tool and carrier therefor, of a work support adapted to hold the work in position to be acted upon by said tool, means for causing relative reciprocatory longitudinal movement between said tool and support sufficient to cause the cutting point of the tool to travel in both directions entirely across and beyond the work, means for causing a lateral movement of one of said parts toward the other a fixed distance at each longitudinal movement in one direction and a lateral movement away from the other part a less fixed distance on each return longitudinal movement, the said lateral movement taking place in each instance when the point of the tool is beyond the work and out of contact with it, means for varying the actual and relative distances of the transverse movements on each longitudinal movement.

5. In a groove cutting machine the combination with a cutting tool and carrier therefor, of a work support adapted to hold the work in position to be acted upon by said tool, means for causing relative reciprocatory longitudinal movement between said tool and support and means for causing a lateral movement of one of said parts toward the other a fixed distance at each longitudinal movement in one direction and a lateral movement away from the other part a less fixed distance on each return longitudinal movement, and automatic means for stopping the lateral movements of the parts toward each other after a predetermined number of longitudinal movements.

6. In a groove cutting machine the combination with a cutting tool and carrier therefor, of a work support adapted to hold the work in position to be acted upon by said tool, means for causing relative reciprocatory longitudinal movement between said tool and support and means for causing a lateral movement of one of said parts toward the other a fixed distance at each longitudinal movement in one direction and a lateral movement away from the other part a less fixed distance on each return longitudinal movement, and automatic means for stopping the lateral movements of the parts toward each other after a predetermined number of longitudinal movements, and means for varying the number of strokes necessary to bring said stopping means into operation.

7. In a groove cutting machine the combination with a cutting tool and carrier therefor, of a work support adapted to hold the work in position to be acted upon by said tool, means for causing relative reciprocatory longitudinal movement of said tool and support, means including a rotary ratchet and two oppositely facing pawls on stationary pivots for causing a lateral movement of one of said parts toward the other a fixed distance at each longitudinal movement in one direction and for causing a lateral movement away from the other part a less fixed distance on each return longitudinal stroke and an adjustable plate fastened to move with said ratchet covering a section of the ratchet teeth and adapted to come at the limits of its movement respectively under the points of said pawls preventing successively contact with the ratchet and further lateral movement.

8. In a groove cutting machine the combination with a cutting tool and carrier therefor, of a work support adapted to hold the work in position to be acted upon by said tool, means for causing relative reciprocatory longitudinal movement of said tool and support, means including a pawl and ratchet for causing a lateral movement of one of said parts toward the other a fixed distance at each longitudinal movement in one direction and means including another pawl and ratchet to cause a lateral movement away from the other part a less fixed distance on each return longitudinal stroke, automatic means for tripping and throwing out of action the pawl and ratchet moving the parts toward each other when the groove reaches a predetermined depth, and automatic means for throwing out of action the other pawl and ratchet when the parts reach their normal original positions.

9. In a groove cutting machine the combination with a cutting tool and carrier therefor, of a work support adapted to hold the work in position to be acted upon by said tool, means for causing relative reciprocatory longitudinal movement between said tool and support and means for causing a lateral movement of one of said parts toward the other a fixed distance at each longitudinal movement in one direction and a lateral movement away from the other part a less fixed distance on each return longitudinal movement, and automatic means for throwing out of action the means causing the lateral movements of the parts toward each other after a predetermined number of longitudinal movements, and automatic means for throwing out of action the means causing the lateral movements of the parts away from each other when they occupy their original positions.

10. In a groove cutting machine the combination with a cutting tool and carrier therefor, of means for constantly reciprocating them, a support adapted to rigidly hold the work with the surface to be cut adjacent and parallel to the line of normal movement of the point of the tool in reciprocating, and means controlled by the reciprocating mechanism for progressively moving said tool transversely of its longitudinal movement toward the work a fixed distance at each stroke in one direction and for moving it away from the work a less fixed distance on each return stroke, and automatic means for interfering with and stopping the transverse movement of the tool toward the work after a predetermined number of strokes.

11. In a groove cutting machine the combination with a cutting tool and carrier therefor, of means for constantly reciprocating them, a support adapted to rigidly hold the work with the surface to be cut adjacent and parallel to the line of normal movement of the point of the tool in reciprocating, and means controlled by the reciprocating mechanism for progressively moving said tool transversely of its longitudinal movement toward the work a fixed distance at each stroke in one direction and for moving it away from the work a less fixed distance on each return stroke, and automatic means for interfering with and stopping the transverse movement of the tool toward the work after a predetermined number of strokes, while permitting the continuation of the successive movements away from the work on the return strokes.

12. In a groove cutting machine the combination with a cutting tool and carrier therefor, of means for constantly reciprocating them, a support adapted to rigidly hold the work with the surface to be cut adjacent and parallel to the line of normal movement of the point of the tool in reciprocating, and means controlled by the reciprocating mechanism for progressively moving said tool transversely of its longitudinal movement toward the work a fixed distance at each stroke in one direction and for moving it away from the work at a less fixed distance on each return stroke, and automatic means for interfering with and stopping the transverse movement of the tool toward the work after a predetermined number of strokes, while permitting the continuation of the successive movements away from the work on the return strokes, automatic means for stopping the transverse movement away from the work when the tool reaches its original normal position and manually controlled means for setting said transverse moving means in condition for further operation.

13. In a groove cutting machine the combination with a longitudinally movable carriage, of means for reciprocating it longitudinally, a tool carrier mounted on said carriage at its end and adapted to move transversely thereof, a rod connecting said carriage and carrier and having screw threaded engagement with one of them and rotary engagement with the other, right and left ratchet wheels secured to said rod, two oppositely facing pawls on stationary supports, one being adapted to make contact with and turn one ratchet wheel a predetermined distance on the movement of the carriage in one direction to feed the carrier intermittently and the other being adapted to turn the other ratchet wheel in the opposite direction a less fixed amount on the reverse movement of the carriage, and automatic means for interfering with and stopping the action of pawl and ratchet turning the rod in one direction after a predetermined number of strokes while permitting its rotation by the other pawl and ratchet on the return strokes.

14. In a groove cutting machine the combination with a longitudinally movable carriage, of means for reciprocating it longitudinally, a tool carrier mounted on said carriage at its end and adapted to move transversely thereof, a rod connecting said carriage and carrier and having screw threaded engagement with one of them and rotary engagement with the other, right and left ratchet wheels secured to said rod, two oppositely facing pawls on stationary supports, one being adapted to make contact with and turn one ratchet wheel a predetermined distance on the movement of the carriage in one direction to feed the carrier intermittently and the other being adapted to turn the other ratchet wheel in the opposite direction a less fixed amount on the reverse movement of the carriage, and automatic means for interfering with and stopping the action of pawl and ratchet turning the rod in one direction after a predetermined number of strokes while permitting its rotation by the other pawl and ratchet on the return strokes, and automatic means for throwing out of action that other pawl and ratchet when the carrier reaches its original position.

15. In a groove cutting machine the combination with a work support having a portion from which projects a stud or spindle adapted to receive over its exposed end and fit within and project from an article in which an interior groove is to be cut, the said portion of the support and projecting stud being provided with an opening extending longitudinally of the stud to permit a cutting tool to pass through said portion of the support and along the stud and to engage the inner surface of the article to be cut and means for clamping said article on said stud against longitudinal movement.

16. In a groove cutting machine the combination with a work support having a marginal projecting surface and a stud or spindle projecting therefrom at right angles adapted to receive over its free end and fit within an article in which an interior longitudinal groove is to be cut, the said support and stud having an opening therein to receive a longitudinally movable cutting tool in engagement with the interior surface of said article and a clamp for holding said article on said spindle.

17. In a groove cutting machine the combination with a work support having a marginal projecting surface and a stud or spindle projecting therefrom at right angles adapted to receive over its free end and fit within an article in which an interior longitudinal groove is to be cut, the said support and stud having an opening therein to receive a longitudinally movable cutting tool in engagement with the interior surface of said article, and a double acting hand operated cam which when turned moves to position partly across the end of the article and clamps it against said marginal projecting surface.

18. In a groove cutting machine the combination with a work support having a marginal projecting surface and a stud or spindle projecting therefrom at right angles adapted to receive over its free end and fit within an article in which an interior longitudinal groove is to be cut, the said support and stud having an opening therein to receive a longitudinally movable cutting tool in engagement with the interior surface of said article, a cam mounted on a fixed axis at right angles to and at one side of the end of said spindle and provided with an operating handle, the said cam being so mounted that it lies normally out of line with the article on said core but is adapted to move partway across the end of said article and then press it against the marginal projecting surface when its operating handle is turned.

19. In a machine for cutting an interior groove the combination with means for supporting the article to be grooved comprising a fixed frame having an opening therein, a plate fitting against said frame and secured thereto provided with a hollow sleeve fitting within said opening and a central stud within and projecting beyond the end of said sleeve, the said sleeve and stud being adapted to fit the outer and inner surfaces of the article, the said stud being provided with a longitudinal groove or side opening and the plate with a corresponding opening to receive a cutting tool and to permit it to move longitudinally of the article to cut the groove, means for clamping the article endwise against said plate, a cutting tool and means for so reciprocating and feeding it as to cut a groove in the article.

20. In a machine for cutting an interior groove the combination with means for supporting the article to be grooved comprising a fixed frame having an opening therein, a plate fitting against said frame and secured thereto provided with a hollow sleeve fitting within said opening and a central stud within and projecting beyond the end of said sleeve, the said sleeve and stud being adapted to fit the outer and inner surfaces of the article, the said stud being provided with a longitudinal groove or side opening and the plate with a corresponding opening to receive a cutting tool and to permit it to move longitudinally of the article to cut the groove, means for clamping the article endwise against said plate, a cutting tool and means for so reciprocating and feeding it as to cut a groove in the article, the said plate having an oil passageway and groove leading to said tool opening across the end of the article to be cut.

21. In a machine for cutting an interior groove the combination with means at one end of said machine for supporting the article to be grooved comprising a projecting spindle or stud on which the article may be placed and fits and a hand operated clamp which when given a slight turn clamps the article endwise on the stud, a cutting tool adapted to enter said article from the other end of the machine, means between said support and the other end of the machine for constantly reciprocating said tool and to feed it progressively toward the work to cut a groove, means for automatically stopping the feed of said tool toward the work when the groove reaches a predetermined depth, means for then automatically moving the tool progressively away from the work until it reaches its original normal position, means for then automatically stopping said movement away from the work while the reciprocations of the tool continue and means having an operating portion adjacent the work support to manually set the mechanism to cause movement of the tool toward the work on subsequent reciprocations.

22. In a groove cutting machine the combination with a cutting tool supported at one end and having a marginal cutting edge at its free end, means for constantly reciprocating said tool longitudinally, a support for an article in which an interior longitudinal groove is to be cut so shaped and formed as to receive and guide said article into working position around and along the reciprocating end of the tool to working position while preventing contact thereof with the tool reciprocating therein, means for securing the article in place in working position and means for causing the tool to approach the inner wall of said article and cut a groove therein.

23. In a groove cutting machine the combination with a cutting tool supported at one end and having a marginal cutting edge at its free end, means for constantly reciprocating said tool longitudinally, a support for an article in which an interior longitudinal groove is to be cut so shaped and formed as to receive and guide said article into working position around and along the reciprocating end of the tool to working position while preventing contact thereof with the tool reciprocating therein, means for securing the article in place in working position, means adapted to be brought into action manually for causing said tool to automatically approach the work at each reciprocation to cut a groove by a succession of cuts, automatic means for stopping the approach of the tool toward the work when the groove reaches a predetermined depth, automatic means for then returning the tool to its original or normal reciprocating position out of line with the work, and automatic means for then preventing further lateral movement of the tool until manually set in operation.

24. In a groove cutting machine the combination with a longitudinally movable carriage, of means for reciprocating it longitudinally, a tool carrier mounted on said carriage at its end and adapted to move transversely thereof, a rod connecting said carriage and carrier and having screw threaded engagement with one of them and rotary engagement with the other, ratchet mechanism for rotating said rod to move said carrier on said carriage including two oppositely facing pawls on stationary supports one of which operates near the end of the forward movement of the carriage to turn the rod a certain amount in one direction and the other of which near the end of the return movement of the carriage operates to turn the rod a greater amount in the opposite direction and automatic means for preventing that pawl which causes the greater movement from engaging the ratchet after a predetermined number of strokes while permitting the other pawl to continue to engage and operate the ratchet and rod.

25. In a groove cutting machine the combination with a longitudinally movable carriage, of means for reciprocating it longitudinally, a tool carrier mounted on said carriage at its end and adapted to move transversely thereof, a rod connecting said carriage and carrier and having screw threaded engagement with one of them and rotary engagement with the other, ratchet mechanism for rotating said rod to move said carrier on said carriage including two oppositely facing pawls on stationary supports one of which operates near the end of the forward movement of the carriage to turn the rod a certain amount in one direction and the other of which near the end of the return movement of the carriage operates to turn the rod a greater amount in the opposite direction and automatic means for preventing that pawl which causes the greater movement from engaging the ratchet after a predetermined number of strokes while permitting the other pawl to continue to engage and operate the ratchet and rod and automatic means for preventing said other pawl which normally operates on the forward stroke from engaging and operating the ratchet and rod when the carrier reaches its original position whereby the reciprocations of the carriage will then cause no lateral movement of the carrier.

In testimony whereof I affix my signature.

HENRY E. VAN NESS.